United States Patent
Lin et al.

(10) Patent No.: US 10,782,820 B2
(45) Date of Patent: Sep. 22, 2020

(54) ELECTRONIC DEVICE AND INPUT ELEMENT THEREOF

(71) Applicant: ASUSTeK COMPUTER INC., Taipei (TW)

(72) Inventors: Bin-Yi Lin, Taipei (TW); Chung-Wei Liang, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 0 days.

(21) Appl. No.: 16/380,099

(22) Filed: Apr. 10, 2019

(65) Prior Publication Data
US 2019/0324587 A1    Oct. 24, 2019

(30) Foreign Application Priority Data
Apr. 19, 2018  (CN) .......................... 2018 1 0354379

(51) Int. Cl.
  *G06F 3/0354*  (2013.01)
  *G06F 3/041*   (2006.01)

(52) U.S. Cl.
  CPC ........ *G06F 3/0414* (2013.01); *G06F 3/03543* (2013.01); *G06F 3/03547* (2013.01)

(58) Field of Classification Search
  CPC .... G06F 3/016; G06F 3/0414; G06F 3/03543; G06F 3/03547; G06F 2203/04106
  See application file for complete search history.

(56) References Cited

U.S. PATENT DOCUMENTS

| | | | |
|---|---|---|---|
| 6,686,901 B2 | 2/2004 | Rosenberg | |
| 7,339,574 B2 | 3/2008 | Kyung et al. | |
| 7,710,397 B2 | 5/2010 | Krah et al. | |
| 9,304,587 B2 | 4/2016 | Wright et al. | |
| 9,483,137 B2 | 11/2016 | Yen | |
| 2007/0152966 A1 | 7/2007 | Krah et al. | |
| 2008/0111791 A1 | 5/2008 | Nikittin | |
| 2017/0003789 A1 | 1/2017 | Woolley et al. | |
| 2018/0181200 A1* | 6/2018 | Olien ..................... G06F 3/016 |

FOREIGN PATENT DOCUMENTS

| | | |
|---|---|---|
| CN | 2490626 Y | 5/2002 |
| CN | 201820210 U | 5/2011 |
| CN | 202230451 U | 5/2012 |
| CN | 102999092 A | 3/2013 |
| CN | 202995571 U | 6/2013 |
| CN | 103984423 A | 8/2014 |

* cited by examiner

*Primary Examiner* — Robert J Michaud
(74) *Attorney, Agent, or Firm* — McClure, Qualey & Rodack, LLP

(57) ABSTRACT

An electronic device and an input element thereof are provided. The electronic device includes a first body, a second body and an input element. The second body with an accommodating groove is connected to the first body. The input element is detachably accommodated in the accommodating groove of the second body and includes a pressure sensing layer, a vibration layer and a transmission layer. The pressure sensing layer of the input element receives a force to generate a signal. The vibration layer vibrates according to the signal. The transmission layer is disposed between the pressure sensing layer and the vibration layer and configured to transmit the vibration generated by the vibration layer.

16 Claims, 9 Drawing Sheets

US 10,782,820 B2

ELECTRONIC DEVICE AND INPUT ELEMENT THEREOF

CROSS-REFERENCE TO RELATED APPLICATION

This application claims the priority benefit of Chinese Application Serial No. 201810354379.4, filed on Apr. 19, 2018. The entirety of the above-mentioned patent application is hereby incorporated by reference herein and made a part of specification.

BACKGROUND OF THE INVENTION

Field of the Invention

The invention provides an electronic device and, more particularly, to an electronic device including an input element.

Description of the Related Art

Notebook computers are easy to carry because of their short and thin. In general, a notebook computer provides with a display and a casing, and equipped with input devices such as a mouse or a keyboard. A control panel is disposed at a surface of the casing that adjacent to the display. A keyboard is provided on the control panel. By operating the keyboard, information is inputted into the notebook computer and shows on the display. In addition, the mouse is operated by users to control the notebook computer.

BRIEF SUMMARY OF THE INVENTION

An electronic device is provided herein. An input element is selectively combined with a second body to improve the application and safely keep the input element while carried.

According to the first aspect, an electronic device is provided herein. The electronic device includes a first body; a second body, connected to the first body and having an accommodating groove; and an input element, detachably accommodated in the accommodating groove and comprising: a pressure sensing layer, configured to receive a force to generate a signal; a vibration layer, configured to vibrate according to the signal; and a transmission layer, disposed between the pressure sensing layer and the vibration layer and configured to transmit the vibration generated by the vibration layer.

According to the second aspect, an input element applied to an electronic device is provided herein. The input element includes a pressure sensing layer configured to receive a force to generate a signal; a vibration layer configured to vibrate according to the signal; and a transmission layer disposed between the pressure sensing layer and the vibration layer and configured to transmit the vibration generated by the vibration layer.

The electronic device disclosed here provides the input element having the vibration layer which vibrates at different intensities in response to the strength of the force that applied on the input element.

In order to make the foregoing features and advantages of the disclosure comprehensible, embodiments accompanied with figures are described in detail below.

DETAILED DESCRIPTION OF THE EMBODIMENTS

Figure 1A:
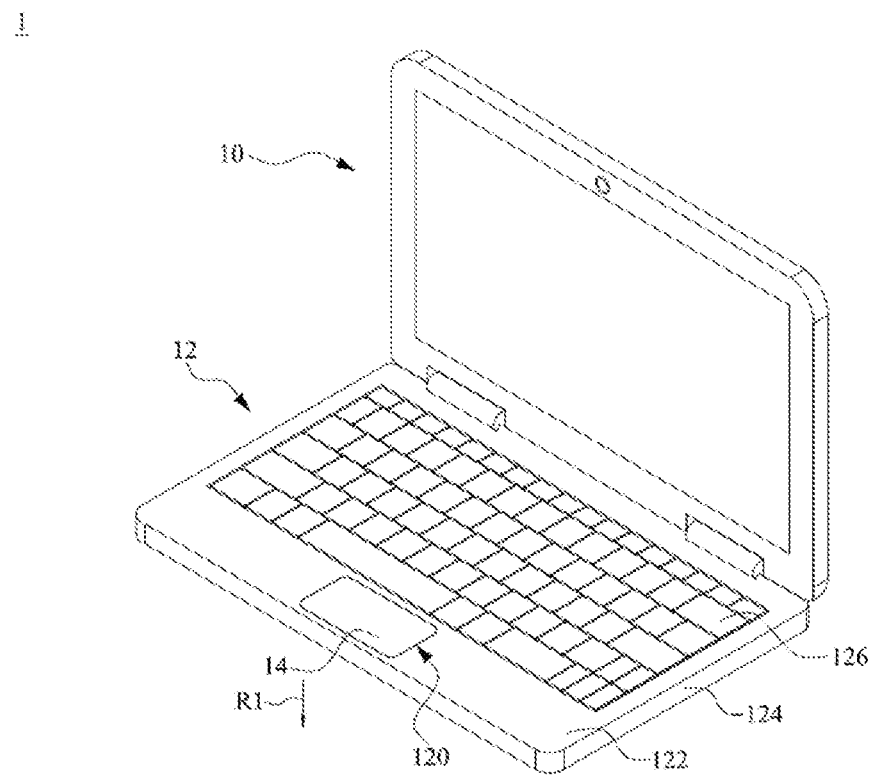
FIG. 1A is a three-dimensional view of an electronic device according to an embodiment of the disclosure.
Figure 1B:
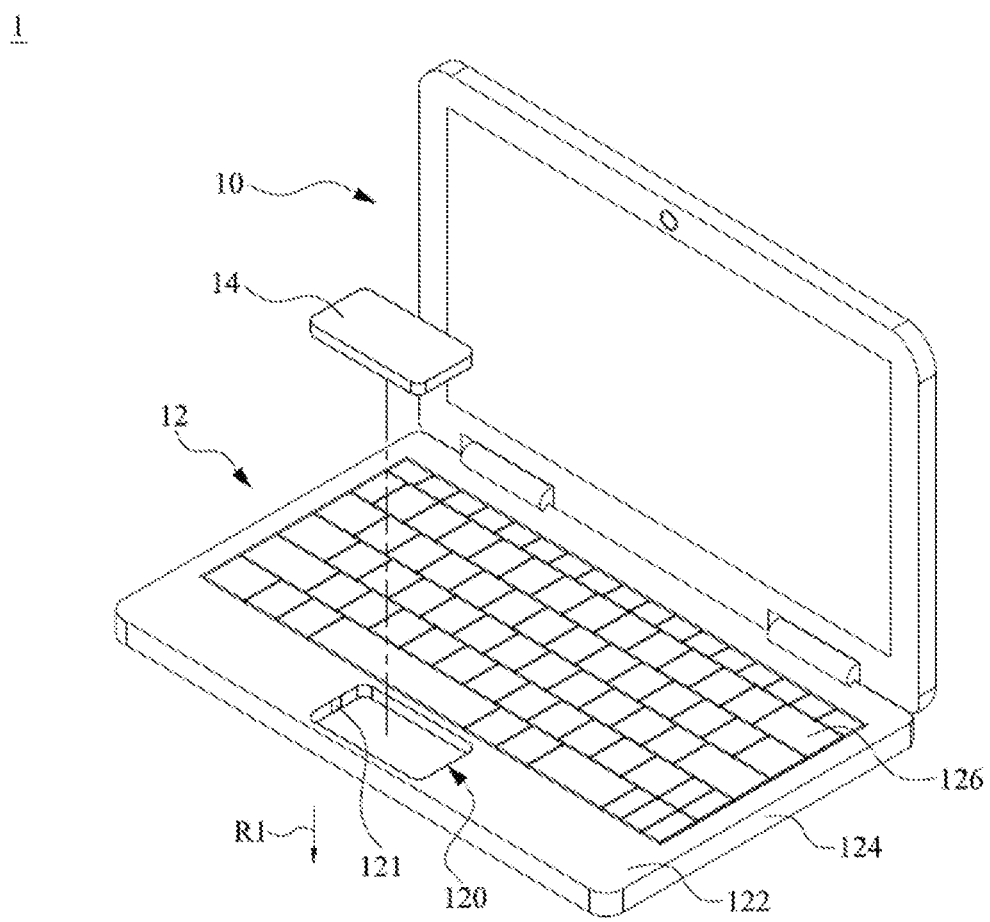
FIG. 1B is a structural analysis view of an electronic device according to an embodiment of the disclosure.

Please refer to FIG. 1A and FIG. 1B. FIG. 1A is a three-dimensional view of an electronic device 1 according to an embodiment of the disclosure. FIG. 1B is a structural analysis view of an electronic device 1 according to an embodiment of the disclosure. As shown in FIG. 1A and FIG. 1B, in this embodiment, the electronic device 1 includes a first body 10, a second body 12 and an input element 14. In this embodiment, the electronic device 1 is a notebook computer. In other embodiments, the configuration as disclosed in the disclosure is applicable to any suitable electronic device. In an embodiment, the input element 14 is a mouse. In an embodiment, the input element 14 is a thinned mouse including a plurality of layered structures. In this embodiment, the first body 10 is a display, and the second body 12 is a host with keyboard 126. In other embodiments, any suitable device is applicable to the first body 10 and/or the second body 12.

In FIG. 1A and FIG. 1B, the second body 12 is connected to the first body 10 and includes a main board (not shown), an accommodating groove 120, an output/input port 121 (see FIG. 1B), an input operation surface 122, a side wall 124 and a keyboard 126. The side wall 124 of the second body 12 surrounds the input operation surface 122. The main board is disposed in a space surrounded by the side wall 124 and the input operation surface 122. The accommodating groove 120 of the second body 12 is formed on the input operation surface 122 and is recessed relative to the input operation surface 122 along a first recessed direction R1. In this embodiment, the accommodating groove 120 is a rectangular groove.

In this embodiment, the input element 14 is configured to be detachably accommodated in the accommodating groove 120 of the second body 12 and the size of the input element 14 substantially conforms to the size of the accommodating groove 120. The output/input port 121 (see FIG. 1B) is disposed in the accommodating groove 120 and configured to correspond to a connector 148 (see FIG. 2A) of the input element 14.

Figure 2A:
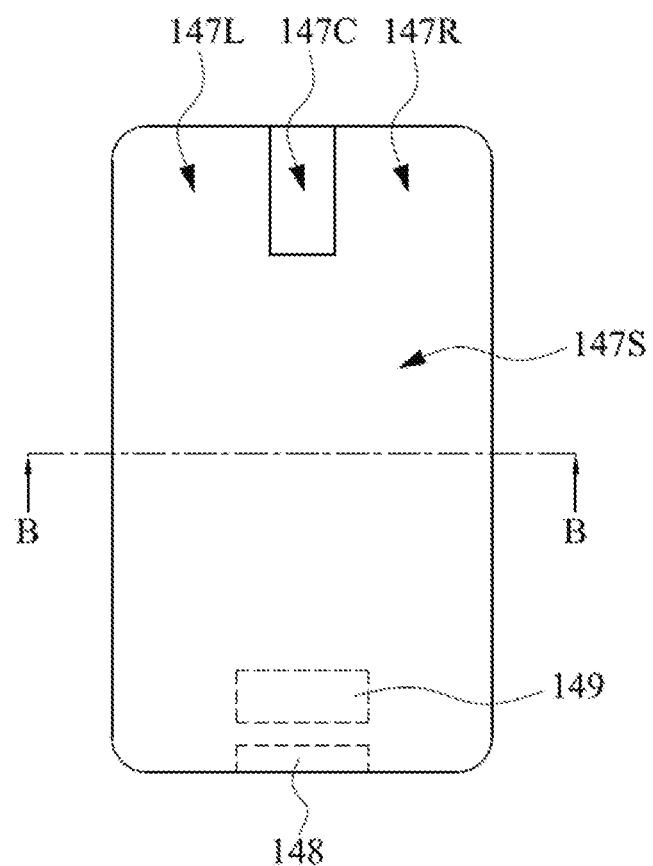
FIG. 2A is a top view of an input element according to an embodiment of the disclosure.
Figure 2B:
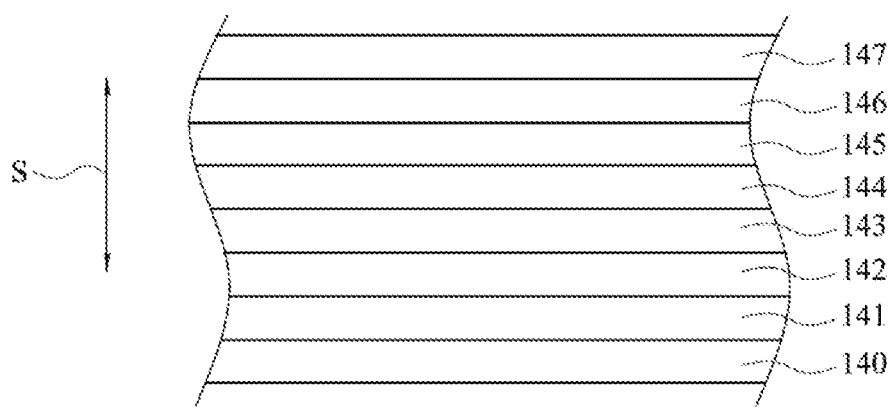
FIG. 2B is a cross-sectional view of the structure of FIG. 2A taken along line B-B.

Please refer to FIG. 2A, FIG. 2B and FIG. 3A to FIG. 3F. FIG. 2A is a top view of an input element 14 according to an embodiment of the disclosure. FIG. 2B is a cross-sectional view of the structure of FIG. 2A taken along line B-B. FIG. 3A to FIG. 3F are top views of different layers in the input element 14 according to an embodiment of the disclosure.

As shown in FIG. 2B, in this embodiment, the input element 14 (see FIG. 2A) sequentially includes a position sensing layer 140, a control layer 141, a power element 142, a vibration layer 143, a transmission layer 144, a pressure sensing layer 145, a touch layer 146 and a protective layer 147 from one end to the other end. In addition, the input element 14 further includes a connector 148 (see FIG. 2A) and a wireless communication module 149 (see FIG. 2A).

In this embodiment, when the input element 14 is accommodated in the accommodating groove 120 of the second body 12, the connector 148 (see FIG. 2A) of the input element 14 electrically connects to the main board (not shown) of the electronic device 1 through the output/input port 121 (see FIG. 1B) located in the accommodating groove 120. Further, when the input element 14 is separated from the second body 12 of the electronic device 1, the input element 14 is able to communicate with the second body 12 (see FIG. 1A and FIG. 1B) via the wireless communication module 149. In an embodiment, the wireless communication module 149 is a Bluetooth communication module. In an embodiment, the input element 14 is connected to the second body 12 via an electrical connecting wire (not shown). In an embodiment, the second body 12 is further provided with a wire slot (not shown) in the accommodating groove 120 (see FIG. 1A and FIG. 1B) for store the electrical connecting wire when the input element 14 is accommodated in the accommodating groove 120.

As shown in FIG. 2B, the position sensing layer 140, the control layer 141, the power element 142, the vibration layer 143, the transmission layer 144, the pressure sensing layer 145, the touch layer 146 and the protective layer 147 of the input element 14 are formed along a direction S. When the input element 14 (see FIG. 2A) is accommodated in the accommodating groove 120 of the second body 12 (see FIG. 1A and FIG. 1B), the first recessed direction R1 (see FIG. 1A and FIG. 1B) is parallel to the direction S.

Figure 2C:
FIG. 2C is a cross-sectional view of an input element according to another embodiment of the disclosure.

In an embodiment, the positions of the control layer 141, the power element 142, the vibration layer 143, the transmission layer 144 and the pressure sensing layer 145 of the input element 14 as shown in FIG. 2B are arbitrarily arranged between the position sensing layer 140 and the touch layer 146. In an embodiment, as shown in FIG. 2C, the input element 24 is configured with layers that formed sequentially with the position sensing layer 140, the power element 142, the control layer 141, the pressure sensing layer 145, the vibration layer 143, the transmission layer 144, the touch layer 146 and the protective layer 147.

In FIG. 2B, the position sensing layer 140 of the input element 14 is configured to movably contact an operation surface (not shown) and configured to generate a tracking signal when the input element 14 moves along the operation surface, and is electrically connected to a microcontroller 1412 (see FIG. 3A) in the control layer 141. A cursor displayed on the first body 10 is moved according to the tracking signal. In this embodiment, the position sensing layer 140 is an optical element. In some embodiments, the position sensing layer 140 includes a trackball.

Figure 3A:
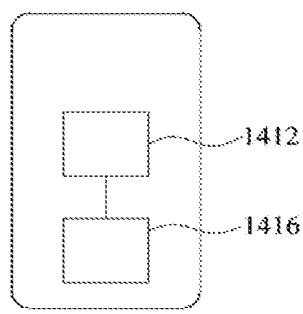
FIG. 3A to FIG. 3H are top views of different layers in the input element according to an embodiment of the disclosure.

Please refer to FIG. 2B and refer to FIG. 3A. In this embodiment, the control layer 141 of the input element 14 further includes a processor 1416. The microcontroller 1412 of the control layer 141 is configured to capture data from different input components (such as the position sensing layer 140, the pressure sensing layer 145, and/or the touch layer 146) and provide the captured data to the processor 1416 for processing.

Figure 3B:
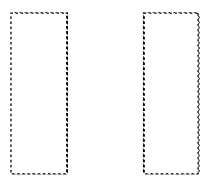

Please refer to FIG. 2B and refer to FIG. 3B. In this embodiment, the power element 142 of the input element 14 is disposed on a side, away from the transmission layer 144, of the vibration layer 143. And, the power element 142 is electrically connected to the position sensing layer 140, the control layer 141, the vibration layer 143, the pressure sensing layer 145 and the touch layer 146. In this embodiment, the power element 142 is a battery. Thereby, the power element 142 drives the position sensing layer 140, the control layer 141, the vibration layer 143, the pressure sensing layer 145 and the touch layer 146.

Figure 3C:
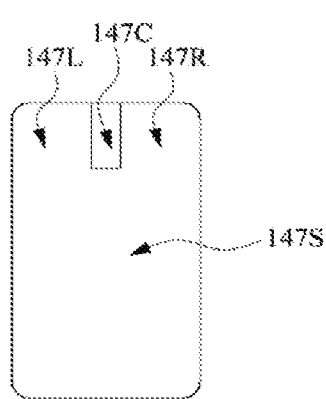

Please refer to FIG. 2B and refer to FIG. 3C. In this embodiment, the protective layer 147 of the input element 14 is disposed on a side, away from the transmission layer 144, of the touch layer 146. In addition, the protective layer 147 has button areas 147C, 147L and 147R and a cursor area 147S to input a signal by receiving a user's operating. In an embodiment, the user operates on the cursor area 147S to move the cursor, and touches the button area 147C to execute the function of pressing the middle button of the mouse, touches the button area 147L to execute the function of pressing the left button of the mouse, and touches the button area 147R to execute the function of pressing the right button of the mouse.

In this embodiment, the protective layer 147 has a single-layer structure. In other embodiments, the protective layer 147 is a multilayer structure. In this embodiment, the material of the protective layer 147 includes at least one of polyamide or polyethylene terephthalate. The protective layer 147 of this embodiment has friction resistance, extensibility and tensile strength to protect the control layer 141, the power element 142, the vibration layer 143, the transmission layer 144, the pressure sensing layer 145 and the touch layer 146 located below the protective layer 147.

Figure 3D:
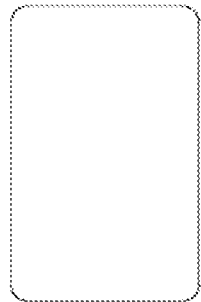

Please refer to FIG. 2B and refer to FIG. 3D. In this embodiment, the touch layer 146 of the input element 14 is disposed on a side, away from the transmission layer 144, of the pressure sensing layer 145. The touch layer 146 senses the touch action of the user, and when the user approaches and/or contacts the protective layer 147, the touch layer 146 generates a touch sensing signal.

In some embodiments, the touch layer 146 includes a capacitive sensing element. The capacitive sensing element is configured to determine whether a conductor exists above the protective layer 147 as shown in FIG. 2B to make the touch layer 146 to generate a touch sensing signal. The capacitive sensing element includes at least one of an electrode or a wire. As the conductor approaches the protective layer 147 of the input element 14, a capacitance is formed between the conductor and the electrode/wire in the touch layer 146. The capacitance in each electrode/wire is measured by a capacitive sensing circuit or the microcontroller 1412 (see FIG. 3A) in the control layer 141. That is, the change of capacitance at each electrode/wire is detected by the microcontroller 1412 to determine whether or not a conductor exists above the protective layer 147. Thereby, in contrast to a physical button, the touch layer 146 enhances the function of the input element 14 in use.

In some embodiments, the cursor area 147S and the button areas 147C, 147L and 147R located on the protective layer 147 and the touch layer 146 below the cursor area 147S are formed by a plurality of touch pads.

In some embodiments, the touch layer 146 includes a plurality of conductive patterns therein. The material of the conductive patterns of the touch layer 146 is indium tin oxide (ITO) or indium zinc oxide (IZO). In addition, the conductive patterns in the touch layer 146 are electrically connected to the microcontroller 1412 (see FIG. 3A) through metal wires (not shown). Therefore, when the conductive pattern in the touch layer 146 senses a touch operation, the corresponding touch signal is transmitted to the microcontroller 1412 in the control layer 141 through the metal wire to process the corresponding touch signal.

Figure 3E:
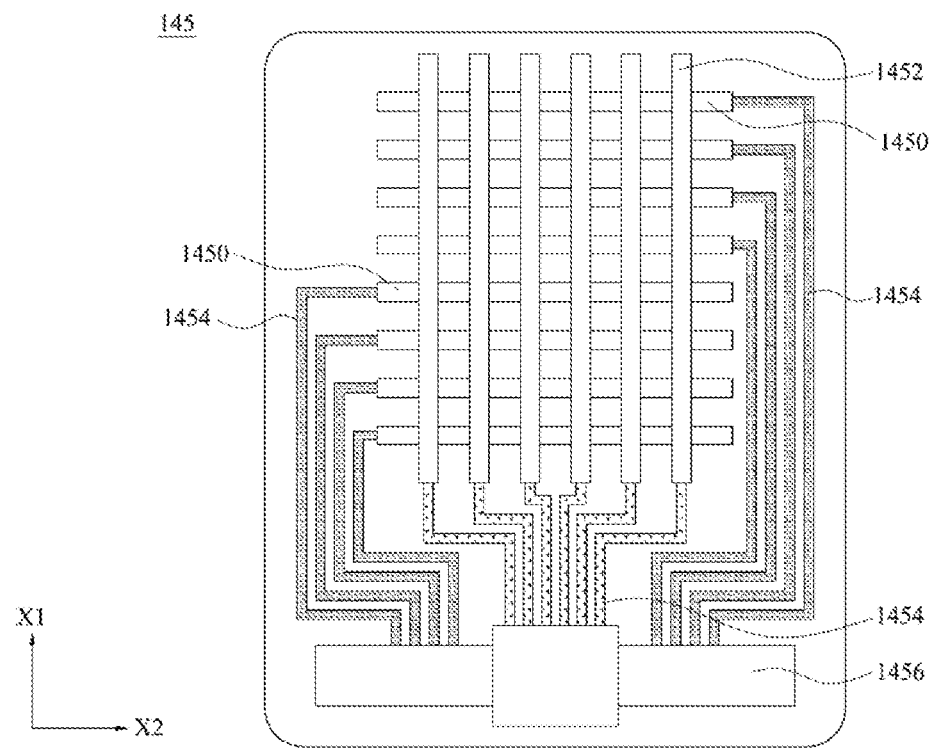

Please refer to FIG. 2B and refer to FIG. 3E. In this embodiment, the pressure sensing layer 145 of the input element 14 is configured to receive a force to generate a signal so as to sense a user's touch operation. The pressure sensing layer 145 includes a plurality of first electrode structures 1450, a plurality of second electrode structures 1452, a plurality of insulating layers (not shown), a lead structure 1454 and a processor 1456. The first electrode structures 1450 are arranged in parallel to each other and extend along a first direction X1. The second electrode structures 1452 are arranged in parallel to each other and extend along a second direction X2. In some embodiments, the first direction X1 intersects the second direction X2. In this embodiment, the first direction X1 is orthogonal to the second direction X2. The insulating layer is located between the first electrode structure 1450 and the second electrode structure 1452 to electrically insulate from each other. Further, the insulating layer is located at least at the intersection of the first electrode structure 1450 and the second electrode structure 1452. The lead structure 1454 is located at the edge of the pressure sensing layer 145. One end of each lead structure 1454 is electrically connected to the first electrode structure 1450 and the second electrode structure 1452 separately. The other end of each lead structure 1454 is connected to the processor 1456 for transmitting signals between the processor 1456 and the first electrode structure 1450 and transmitting signals between the processor 1456 and the second electrode structure 1452.

Specifically, when the force is applied to the protective layer 147 of the input element 14 as shown in FIG. 2B, the protective layer 147 is deformed by the force, thereby changing the capacitance between the first electrode structure 1450 and the second electrode structure 1452 below the protective layer 147 to further generate a signal. The signal is identified as a starting command signal, a selection signal, or a control signal to control electronic device 1. In some embodiments, the microcontroller 1412 (see FIG. 3A) of the control layer 141 captures the signal generated by the sensing element to determine the magnitude of the force. Therefore, the pressure sensing layer 145 generates signal according the strength of the force that applied by the user on the protective layer 147, and then the vibration layer 143 subsequently vibrates at different intensities in response to the signals generated by the pressure sensing layer 145. In an embodiment, the vibrations with different intensities are corresponding to different starting command signals, different selection signals or different control signal respectively, thus the electronic device 1 is operated by the strength of the force that applied on the protective layer 147 by the user intuitively.

In an embodiment, when the user clicks on the area where the touch layer 146 overlaps the pressure sensing layer 145, a touch sensing signal and a pressure sensing signal are simultaneously generated.

In some embodiments, the pressure sensing layer 145 is a single-layer touch electrode structure, and the first electrode structure 1450 and the second electrode structure 1452 are in the same level plane to reduce the thickness of the pressure sensing layer 145. In other embodiments, the pressure sensing layer 145 is of a two-layer or multilayer touch electrode structure, and the first electrode structure 1450 and the second electrode structure 1452 are separated into different layers by a full-surface insulating layer.

Figure 3F:
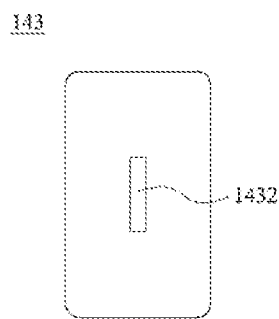
Figure 3G:
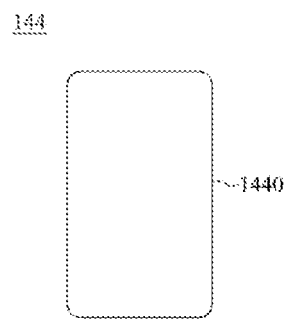
Figure 3H:
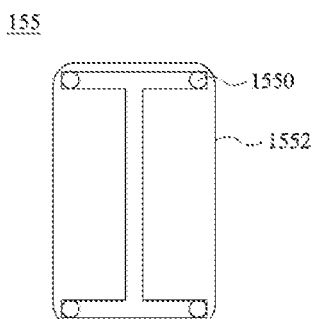

In some embodiments, the pressure sensing layer 145 shown in FIG. 2B is replaced with a pressure sensing layer 155 as shown in FIG. 3H. The pressure sensing layer 155 includes a plurality of sensing elements 1550. In FIG. 3H, the sensing elements 1550 in the pressure sensing layer 155 are adjacent to at least one of the position sensing layer 140 or the edge 1552 of the pressure sensing layer 155 and each of the sensing elements 1550 are electrically connected to each other. Further, the sensing elements 1550 are disposed adjacent to at least one of the position sensing layer 140 or corners of the pressure sensing layer 155.

Further, when a force is applied to the protective layer 147 of the input element 14, the protective layer 147 is deformed by the force, so that the force applied to the protective layer 147 is distributed to the sensing elements 1550 located below the protective layer 147 to trigger the sensing elements 1550 to generate a signal. The signal includes but not limited to a starting command signal, a selection signal, or a control signal. In this embodiment, the material of the sensing elements 1550 is a ceramic piezoelectric material. In some embodiments, the sensing element includes a force sensing resistive element, a force sensing capacitive element, a pressure element, a pressure plate, a piezoelectric conversion element, or any suitable element.

Please refer to FIG. 2B and refer to FIG. 3F. In this embodiment, the vibration layer 143 of the input element 14 is configured to vibrate according to the signal generated by the pressure sensing layer 145 such that the user confirms that his/her action has been received by the input element 14. In this embodiment, the vibration layer 143 includes at least one vibration element 1432. The vibration element 1432 is located at a central portion of the vibration layer 143 and is electrically connected to the microcontroller 1412 (see FIG. 3A) in the control layer 141.

In some embodiments, the vibration layer 143 of the input element 14 vibrates according to the signals generated by other layers in the input element 14, such as the position sensing layer 140, the pressure sensing layer 145 and/or the touch layer 146. In some embodiments, the vibration element 1432 is located at an area of the vibration layer 143. In an embodiment, the input element 14 is provided with vibration elements 1432 disposed below each button area (such as, button areas 147C, 147L and 147R) of the protective layer 147 as shown in FIG. 3C to provide force feedback in the actuation area of the user. In some embodiments, the vibration element 1432 is a magnetic element to provide feedback of the force received by the input element 14 by impacting the transmission layer 144 with the magnetic element.

Please refer to FIG. 2B and refer to FIG. 3G. In this embodiment, the transmission layer 144 of the input element 14 is disposed between the pressure sensing layer 145 and the vibration layer 143 and is configured to transmit the vibration generated by the vibration layer 143. Thereby, the transmission layer 144 of this embodiment uniformly transmits the vibration generated by the vibration layer 143 to the protective layer 147, so that the user feels the vibration at different positions on the protective layer 147 and confirms that his/her action has been received by the input element 14 to prevent the user from misjudgment when operating the electronic device 1, thereby enhancing the convenience of use of the electronic device 1. In addition, the transmission layer 144 prevents the vibration layer 143 from contacting the pressure sensing layer 145, so as to prevent the vibration layer 143 from directly impacting the pressure sensing layer 145 when vibrating, which causes damage to the pressure sensing layer 145, thereby prolonging the service life of the input element 14 in use.

In this embodiment, the vertical projections of the pressure sensing layer 145 and the vibration layer 143 of the input element 14 on the transmission layer 144 are located within the outer edge 1440 of the transmission layer 144. Thereby, the vibration generated by the vibration layer 143 is transmitted to an outer casing (not shown) of the input element 14 by the edge of the transmission layer 144 without being limited by the pressure sensing layer 145 and the vibration layer 143 inside the input element 14 in structure, thereby enhancing the vibration effect of the input element 14.

Figure 4A:
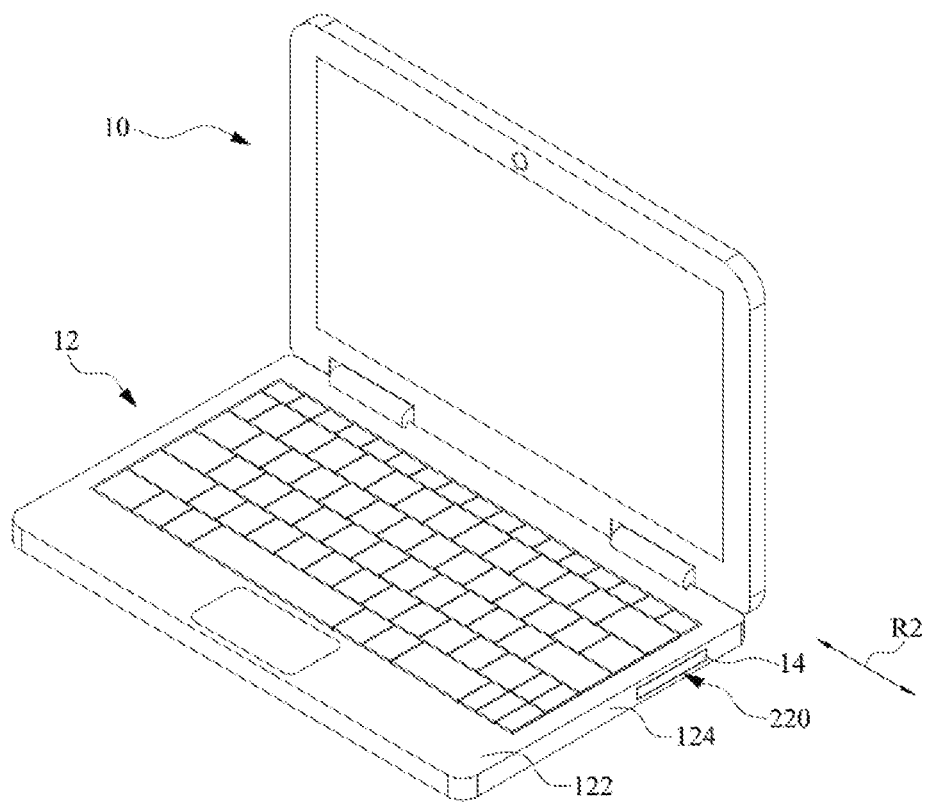
FIG. 4A is a three-dimensional view of an electronic device according to another embodiment of the disclosure.
Figure 4B:
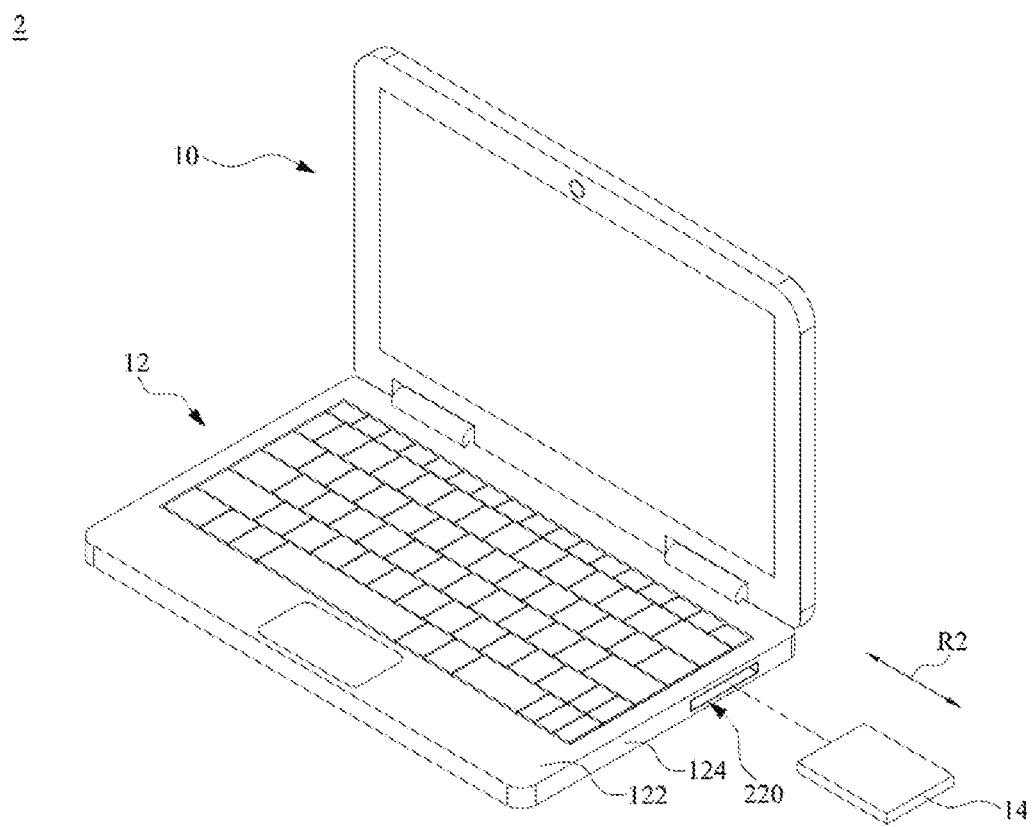
FIG. 4B is a structural analysis view of an electronic device according to another embodiment of the disclosure.

Please refer to FIG. 4A and FIG. 4B. FIG. 4A is a three-dimensional view of an electronic device 2 according to another embodiment of the disclosure. FIG. 4B is a structural analysis view of an electronic device 2 according to another embodiment of the disclosure. As shown in FIG. 4A and FIG. 4B, the electronic device 2 of this embodiment includes a first body 10, a second body 22 and an input element 14. The structures and functions of these elements and the connection relationship among the elements are substantially the same as those of the electronic device 1 shown in FIG. 1A and FIG. 1B. Therefore, reference may be made to the related description, and details are not described herein again.

In an embodiment as showed in FIG. 4A and FIG. 4B, an accommodating groove 220 of the second body 12 is formed on a side wall 124. The accommodating groove 220 of the second body 22 is recessed relative to the side wall 124 along a second recessed direction R2. When the input element 14 is accommodated in the accommodating groove 120 of the second body 22, the second recessed direction R2 is perpendicular to the stacking direction S (see FIG. 2B).

From the above detailed description of the specific embodiments of the disclosure, it is clearly seen that the input element is selectively combined with the second body of the electronic device of the disclosure to improve the application and safely keep the input element while carried. In addition, the pressure sensing layer generates signals in response to the strength of the force that applied by the user on the protective layer, and then the vibration layer vibrates at different intensities in response to the signals generated by the pressure sensing layer and triggers different control signals, thus the electronic device is operated by the strength of the force that applied on the protective layer by the user intuitively.

In addition, the transmission layer of the input element uniformly transmits the vibration generated by the vibration layer to the protective layer, so that the user feels the vibration at different positions on the protective layer and confirms that his/her action has been received by the input element to prevent the user from misjudgment when operating the electronic device, thereby enhancing the convenience of use of the electronic device. Further, the transmission layer prevents the vibration layer from contacting the pressure sensing layer, so as to prevent the vibration layer from directly impacting the pressure sensing layer when vibrating, which causes damage to the pressure sensing layer, thereby prolonging the service life of the input element in use.

Although the disclosure is described with reference to the above embodiments, the embodiments are not intended to limit the disclosure. A person of ordinary skill in the art may make variations and modifications without departing from the spirit and scope of the disclosure. Therefore, the protection scope of the disclosure should be subject to the appended claims.

What is claimed is:

1. An electronic device, comprising:
a first body;
a second body, connected to the first body and having an accommodating groove; and
an input element, detachably accommodated in the accommodating groove and comprising:
a pressure sensing layer, configured to receive a force to generate a signal;
a vibration layer, stacked below the pressure sensing layer and configured to vibrate according to the signal;
a transmission layer, disposed between the pressure sensing layer and the vibration layer and configured to transmit the vibration generated by the vibration layer; and
a position sensing layer stacked below the vibration layer, comprising an optical element or a trackball, and configured to generate a tracking signal to the first body or the second body when the input element moves along an operation surface.

2. The electronic device according to claim 1, wherein the second body comprises an input operation surface and a side wall, and the accommodating groove is formed on the input operation surface or the side wall.

3. The electronic device according to claim 1, wherein a vertical projections of the pressure sensing layer and the vibration layer on the transmission layer are located within an outer edge of the transmission layer.

4. The electronic device according to claim 1, wherein the pressure sensing layer comprises a plurality of sensing elements, and the plurality of sensing elements is adjacent to the edge of the pressure sensing layer and is electrically connected to each other.

5. The electronic device according to claim 1, wherein the input element further comprises a touch layer, and the touch layer is disposed on a side of the pressure sensing layer away from the transmission layer.

6. The electronic device according to claim 5, wherein the input element further comprises a protective layer, and the protective layer is disposed on a side, away from the transmission layer, of the touch layer.

7. The electronic device according to claim 1, wherein the input element further comprises a power element, and the power element is disposed on a side, away from the transmission layer, of the vibration layer and electrically connected to the vibration layer.

8. The electronic device according to claim 1, wherein the position sensing layer is in a lowermost position of the input element.

9. The electronic device according to claim 1, wherein the transmission layer is in contact with a top surface of the vibration layer.

10. An input element, applied to an electronic device, comprising:
a pressure sensing layer, configured to receive a force to generate a signal;
a vibration layer, stacked below the pressure sensing layer and configured to vibrate according to the signal;
a transmission layer, disposed between the pressure sensing layer and the vibration layer and configured to transmit the vibration generated by the vibration layer; and
a position sensing layer stacked below the vibration layer and comprising an optical element or a trackball.

11. The input element according to claim 10, wherein a vertical projection of the pressure sensing layer and the vibration layer on the transmission layer is located within an outer edge of the transmission layer.

12. The input element according to claim 10, wherein the pressure sensing layer comprises a plurality of sensing elements, and the plurality of sensing elements is adjacent to the pressure sensing layer and is electrically connected to each other.

13. The input element according to claim 10, wherein the input element further comprises a touch layer, and the touch layer is disposed on a side, away from the transmission layer, of the pressure sensing layer.

14. The input element according to claim 13, wherein the input element further comprises a protective layer, and the protective layer is disposed on a side, away from the transmission layer, of the touch layer.

15. The input element according to claim 10, wherein the input element further comprises a power element, and the power element is disposed on a side, away from the transmission layer, of the vibration layer and electrically connected to the vibration layer.

16. The input element according to claim 10, wherein the pressure sensing layer is in a position higher than a top surface of the vibration layer.

* * * * *